United States Patent [19]
Nicole

[11] Patent Number: 5,307,195
[45] Date of Patent: Apr. 26, 1994

[54] METHOD AND MEANS FOR THE TRANSMISSION OF AN ELECTROMAGNETIC SIGNAL IN AN OPTICAL FIBER

[75] Inventor: Pierre Nicole, Saint-Cloud, France
[73] Assignee: Dassault Electronique, Saint-Cloud, France
[21] Appl. No.: 892,621
[22] Filed: Jun. 1, 1992

Related U.S. Application Data
[63] Continuation of Ser. No. 605,996, Oct. 30, 1990, abandoned.

[30] Foreign Application Priority Data
Nov. 9, 1989 [FR] France .................................. 89 14714

[51] Int. Cl.⁵ .................... H04B 10/00; H04B 10/06
[52] U.S. Cl. .................................. 359/156; 359/152; 359/192; 359/173; 343/701; 343/703
[58] Field of Search ............... 359/124, 137, 156, 173, 359/180, 181, 182, 187, 189, 192, 195, 110, 145, 146, 143; 455/67.4, 67.5; 343/701, 703

[56] References Cited

U.S. PATENT DOCUMENTS

| | | | |
|---|---|---|---|
| H370 | 11/1987 | Gold | 333/113 |
| 3,433,958 | 3/1969 | Lenzo et al. | 455/600 |
| 4,221,460 | 9/1980 | Hepner et al. | 359/124 |
| 4,641,926 | 2/1987 | Shirasaki | 359/487 |
| 4,879,763 | 11/1989 | Wood | 358/168 |
| 4,941,205 | 7/1990 | Horst | 455/605 |

OTHER PUBLICATIONS
Cheng et al, Subscriber Loop Architecture, Sep. 1984, All.

Primary Examiner—Richard E. Chilcot, Jr.
Assistant Examiner—Rafael Bacares
Attorney, Agent, or Firm—Christie, Parker & Hale

[57] ABSTRACT

In a method of transmitting an electromagnetic signal in an optical fiber a polarized optical base signal is generated and input at a first and of an optical fiber, an optical signal emerging from the fiber after the base signal has passed through it is recovered at a second end of the fiber; this emergent signal is processed by electro-optical modulation with the electromagnetic signal which is to be transmitted and polarization conversion is effected, and the optical signal modified in this way is reinput to the said second end of the fiber; an optical return signal emerging from the fiber after the modified optical signal has passed through it is recovered at the first end of the optical fiber and this is analyzed in order to determine the characteristics of the electromagnetic signal.

14 Claims, 1 Drawing Sheet

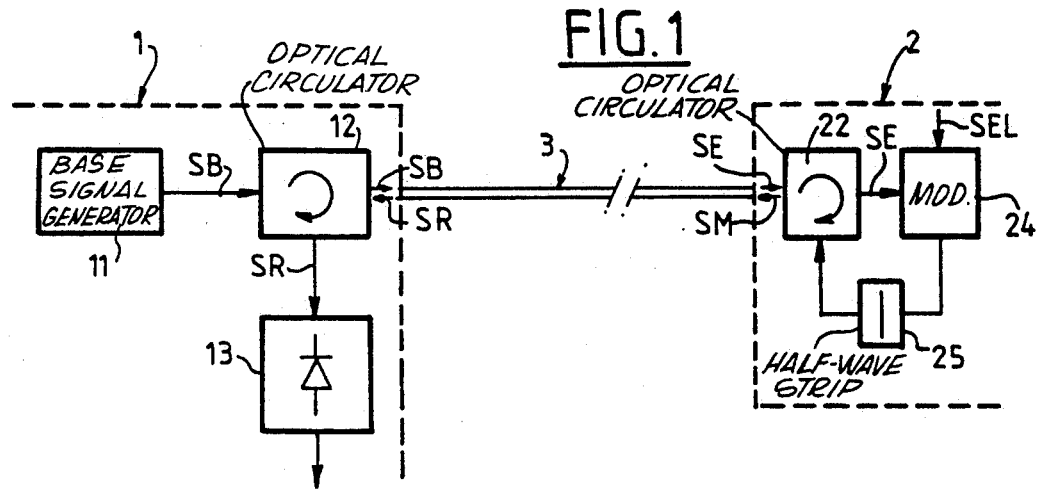
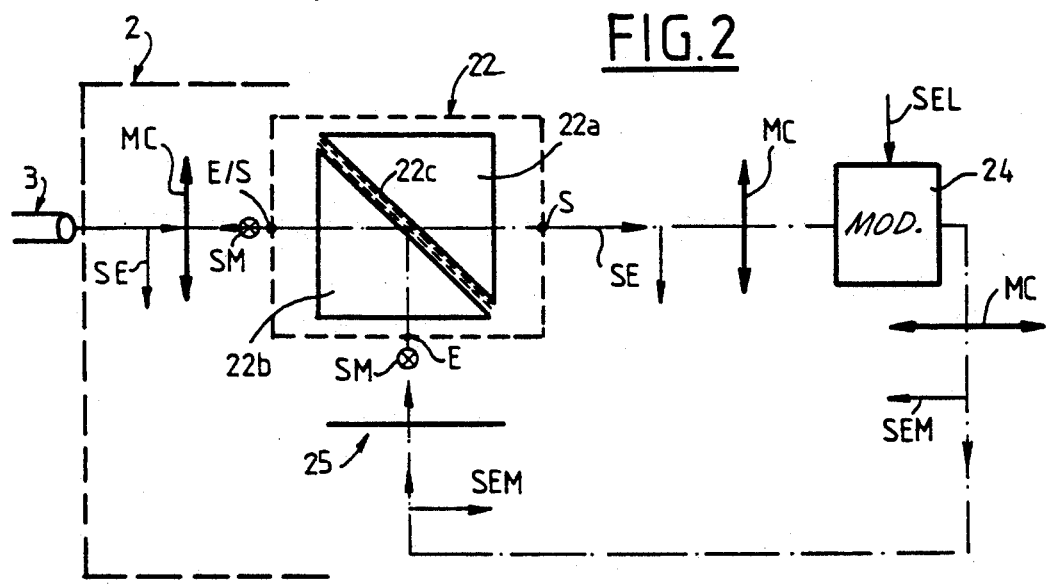
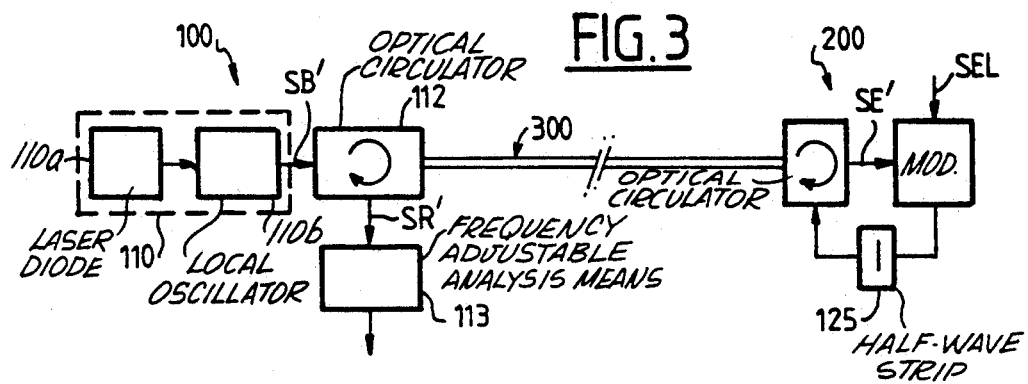

METHOD AND MEANS FOR THE TRANSMISSION OF AN ELECTROMAGNETIC SIGNAL IN AN OPTICAL FIBER

CROSS-REFERENCE TO RELATED APPLICATIONS

This is a continuation of application Ser. No. 07/605,996, filed Oct. 30, 1990, now abandoned.

BACKGROUND OF THE INVENTION

The invention relates to the transmission of an electromagnetic signal.

When an electromagnetic signal is available at a predetermined point it is sometimes necessary to transmit it to another point, particularly for the purposes of analysis or processing.

In order to effect such transmission, the generation of an optical signal at one end of an optical fiber, its modulation by the electromagnetic signal which has to be transmitted, followed by analysis of the modulated optical signal which has passed through the fiber at the other end thereof, in order to determine the characteristics of the electromagnetic signal has been considered.

However, in addition to the fact that such transmission generally requires the use of highly technical components which have a high cost and are susceptible, if not to failures at least to frequent inspection, at both ends of the fiber, it proves very inappropriate for an advantageous, but not restrictive, application of the invention which consists of transmitting an electromagnetic signal from a point which is difficult of access to a maintenance team. In fact, if a component fails, response times may be relatively long and may as a consequence result in a prolonged interruption in transmission which may in some cases be unacceptable.

SUMMARY OF THE INVENTION

The invention provides a new combination of means in order to provide a more satisfactory solution to this problem.

One object of the invention is to provide transmission of the electromagnetic signal in such a way that components which are simple from the mechanical and electronic points of view, and which have very high reliability with the lowest possible cost, can be used at the point where the electromagnetic signal is present.

Another object of the invention is to provide transmission having very satisfactory characteristics, particularly with regard to the signal-to-noise ratio.

In accordance with the invention, a process for the transmission of an electromagnetic signal includes the following stages:

a) a polarized optical base signal is generated and inputted to a first end of an optical fiber b) an optical signal emerging from the fiber is recovered at a second end of the fiber after the base signal has passed through the latter, the emerging signal is processed in a way which involves electro-optical modulation by the electromagnetic signal to be transmitted, and polarization conversion is effected and the thus-modified optical signal is reinputted to the second end of the fiber, and c) a return optical signal emerging from the fiber after passage of the modified optical signal through it is recovered from the first end of the optical fiber and analyzed in order to determine the characteristics of the electromagnetic signal.

In accordance with a first variant of the invention, a constant power base signal which can be used to transmit a broad-band electromagnetic signal, in particular, a microwave signal, is generated.

In accordance with another variant of the invention, more particularly appropriate to narrow-band electromagnetic signals, a modulated base signal is generated.

The invention further provides means for the transmission of an electromagnetic signal, which includes, at a first end of an optical fiber, a first optical assembly which on the one hand inputs an optical base signal issuing from a generator into the fiber and on the other hand recovers on its return a return optical signal for delivery to electro-optical analysis means and at a second end of the fiber a second optical assembly which on the one hand receives an incident polarized optical signal emerging from the fiber after the optical base signal has passed therethrough, in order to deliver it to processing means which include, in series, an electro-optical modulator responding to the electromagnetic signal to be transmitted and optical polarization conversion means and on the other hand inputs to return via the fiber the so modified incident optical signal; the electrical analysis means then determine the characteristics of the electromagnetic signal from the optical return signal emerging from the optical fiber after the modified optical signal has passed through it.

In accordance with a particularly advantageous embodiment of the invention, the first optical assembly includes first means forming an optical circulator, such as a set of polarization separating prisms placed between the first end of the optical fiber, the generator and the electro-optical means of analysis; likewise, the second optical assembly includes second means forming an optical circulator placed between the second end of the optical fiber and the input and the output of the processing means.

Through this manner of construction in particular, the loss of power in the transmission chain can be reduced, and the signal-to-noise ratio can thus be increased.

Other advantages and features of the invention will appear from an examination of the detailed description below and the appended drawing.

BRIEF DESCRIPTION OF THE DRAWING

FIG. 1 is a diagrammatical representation of a first embodiment of transmission means according to the invention, FIG. 2 is a more detailed diagrammatical illustration of a set of polarization separating prisms, and FIG. 3 is a diagrammatical illustration of a second embodiment of transmission means according to the invention.

DETAILED DESCRIPTION OF PREFERRED EMBODIMENT

It is now assumed, even though the invention is not restricted to this particular application, that an electromagnetic signal issuing, for example, from an antenna located in a place which is difficult to access for a maintenance team responsible for checking and/or repairing faulty equipment has to be collected and analyzed. A general object of the invention then consists of providing only highly reliable inexpensive equipment at the foot of the antenna and to displace components of the means whose design and manufacture require more frequent inspection and rapid corrective action in the event of unsatisfactory operation to a place where the installation constraints are less rigorous.

Thus, as illustrated in FIG. 1, the means include a first electro-optical system 1 located at a first end of an optical fiber 3, in principle a single mode optical fiber, and a second electro-optical system 2 at the second end of this optical fiber located at the foot of the antenna in order to receive the electromagnetic signal SEL.

Within this first electro-optical system 1 is provided a first optical assembly including means 12 forming an optical circulator, indicated more simply below unless specified otherwise by "optical circulator", which will be described in detail below. This optical circulator has an input terminal capable of receiving an optical base signal SB, an input/output terminal connected to the first end of the optical fiber, on the one hand to input the signal SB to the said fiber and to receive an optical return signal SR in order to pass it through an output terminal to electro-optical analysis means 13, such as a photodetector.

Optical signal SB, of constant power, is produced by a generator 11, such as a semiconductor laser diode. Signal SB is therefore a polarized signal. In this respect, although such an optical signal is generally elliptically polarized, it is acceptable here, on account of the low power of the orthogonal component of this signal with respect to the total optical power, that signal SB should be polarized linearly, which comes to the same thing as accepting loss of the power of the orthogonal component.

Within second electro-optical system 2 provision is also made for an optical circulator 22 whose input/output terminal is capable of receiving on the one hand an optical signal SE which emerges after passage of the base signal through the fiber and on the other hand to reinput a modified optical signal which, after reverse passage through the fiber provides the return signal SR.

Optical circulator 22, having a similar structure to optical circulator 12, includes an output terminal which delivers the emergent signal SE to an electro-optical modulator 24 (MOD) of the progressive wave type. Means 25 for the orthogonal conversion of optical polarization, such as a half-wave strip, are placed in series between the output of the electro-optical modulator and the input terminal of optical circulator 22.

It will be recalled briefly here that a progressive wave electro-optical modulator includes a waveguide covered by electrodes in which the modulating electromagnetic signal is caused to circulate. Thus, the optical coefficient of the waveguide is altered and the optical signal passing through it is modulated by the electromagnetic signal. Among progressive wave electro-optical modulators, use may, for example, be made of a modulator of the Mach-Zehnder type. Those skilled in the art may refer for further details to the article by Rod C. Alferness, "Waveguide Electrooptic Modulators", IEEE Transactions on Microwave Theory and Techniques, Vol. MTT-30, no. 8, August 1982, the contents of which are incorporated in this description for all necessary purposes.

Optical circulator 22 includes a set of two polarization separating prisms 22a and 22b, such as that which can be obtained from the United States Company, Melles Griot, under reference 03 PBS (FIG. 2). These two prisms are made integral with each other through their respective/oblique faces (hypotenuse) and a dielectric multilayer film 22c is located at this interface.

Such an optical circulator operates with parallel light. Collimation means MC, such as convergent lenses, are then provided between the end of optical fiber 3 and the circulator, between the circulator and the input to the modulator, and between the output from the modulator and half-wave strip 25.

The combination of the composition of the multilayer film and the value of the angle of incidence (in this case 45°) of a light beam striking the interface of the set of prisms causes the emergent signal SE, which is here assumed to be linearly polarized in the plane of the figure, to pass through the two prisms from the input/output terminal E/S to the output terminal S. This signal SE, after having been demodulated in electro-optical modulator 24, maintains the same linear polarization and is passed to half-wave strip 25. For simplicity, the optical means which carry the different signals within electro-optical system 2 have not been shown. Either mirrors or another optical fiber could, for example, be used here for this purpose.

After having passed through half-wave strip 25 the modified signal SM is then polarized linearly in a plane perpendicular to the plane of FIG. 2. This signal, which enters via the input terminal E of the circulator, is then sent to the interface between the two prisms at the input/output terminal E/S and is the reinputted into the optical fiber.

For better understanding, orthogonal optical polarization conversion means have here been shown separate from circulator 22. However, a single component which simultaneously integrates the functions of polarization conversion and optical circulation may be considered.

The device therefore operates as follows:

The polarized base signal SB generated by the semiconducting laser diode is inputted to the first end of the optical fiber. Optical circulator 22 collects the emergent single SE after the base signal has passed through the fiber and delivers it to electro-optical modulator 24. (This modulates the signal SE by the electro-magnetic signal SEL issuing from the antenna.) The modulated signal SEM, which has the same linear polarization as the emergent signal SE, is subjected to orthogonal polarization conversion using half-wave strip 25 and is reinputted to the second end of the optical fiber by circulator 22. This modified signal SM thus passes through the optical fiber in the reverse direction and circulator 12 recovers the return signal SR at the first end after the passage of signal SM. This return signal is then passed to photodetector 13 which deduces the characteristics of the electromagnetic signal SEL.

The combination of means so described can be used as a solution to the problem set. In fact, using an optical fiber in a two-directional way, it has proved possible to place only low cost and reliable components within electro-optical system 2. Because of this it has then been possible to group together the components of the device which require more special attention and more frequent inspection, such as the optical signal generator and the electro-optical means of analysis, at the first end of the optical fiber.

Furthermore, the use of optical signals of different polarization moving in opposite directions within the fiber makes it possible to avoid interference between these different signals, thus reducing losses in the device and increasing its efficiency.

Finally, the use of optical circulators, such as a set of polarization separating prisms, can again minimize losses in the device and increase the signal-to-noise ratio.

It has thus proved possible to transmit broad-band signals, in particular, microwave signals, using a photodetector 13, in particular a microwave photodetector, for which the pass band is equal to the frequency band of the electromagnetic signal SEL.

When an electromagnetic signal SEL has to be transmitted as a narrow band, i.e., a signal whose Fmax/Fmin ratio of the maximum frequency to the minimum frequency is not greater than 2, the embodiment illustrated in FIG. 3 can be used with advantage. In this figure, similar components or components which have a function similar to those shown in FIG. 1 have reference numbers increased by 100 or marked by an apostrophe in comparison with their reference numbers in FIG. 1. Only the differences between these two figures will be described.

In this embodiment, generator 110 includes semiconducting laser diode 110a, together with a local oscillator 110b having a frequency Fo which modulates the signal emitted by the diode and delivers a polarized modulated base signal SB'. Of course, a semiconducting laser diode capable of providing a modulated signal directly could be used instead of an external oscillator 110b.

After the signal SE' has been modulated by the narrow-band electromagnetic signal SEL which is to be transmitted, and orthogonal polarization conversion has been performed, the return signal SR' is passed to the input of analysis means 113. This then has a pass band appropriate to the frequency spectrum of signal SEL, recentered on the frequency of the oscillator. In other words, signals having an intermediate frequency which are representative of the characteristics of the electromagnetic signal, i.e., signals lying within the frequency interval (Fmin-Fo; Fmax-Fo), can be obtained directly from the output of the analysis means. For example, such analysis means is formed by a frequency adjustable analysis means, including, e.g., a tunable photodetector based on the frequency of the oscillator 110b.

This avoids the use of a microwave mixer downstream of analysis means 113.

The invention is not restricted to the embodiments described above, but includes all variants, in particular the following:

any other means forming an optical circulator may be used instead of the set of polarization separating prisms, other means, such as conventional optical couplers, in particular, Y waveguides associated with optical isolators could also be used instead of one and/or other of the means forming the optical circulator. However, such an embodiment would be to the detriment of the signal-to-noise ratio of the device because each of these couplers causes a power loss of 3 dB, the use of circularly or elliptically polarized optical signals could also be considered. The various optical assemblies would then, of course, have to be adapted for this, a non-polarized light generator could also be used. However, in this case it is desirable to place a polarizer on the output therefrom, in this case the polarization conversion means effect orthogonal polarization conversion. However, this does not rule out passing signals which have different polarizations which are not strictly orthogonal to each other in the opposite direction within the optical fiber. In this case the performance of the device may be reduced, the use of an electro-optical modulator incorporating a polarization conversion function could also be envisaged, and this would have the effect of simplifying the optical circulator, in some cases it would also be possible to envisage a multimode optical fiber, but again with the risk of reducing performance.

Of course, some of the means described above may be omitted in variants where they serve no purpose.

I claim:

1. A method for retrieving a microwave signal from a remote location and analyzing the microwave signal, including the steps of:
   a) generating a polarized optical base signal and applying said signal as an input to a first end of an optical fiber;
   b) recovering, at a second end of the optical fiber which is at the remote location, an optical signal emerging from the optical fiber after the base signal has passed therethrough, processing said emerging signal by passing the emerging signal along a loop, wherein along the loop the signal is first processed by electro-optical modulation with the microwave signal, which is to be transmitted, to produce a modulated optical signal, and second by polarization conversion of the modulated optical signal to produce a converted modulated optical signal, and third by reapplying the converted modulated optical signal as an input to the second end of the fiber; and
   c) recovering at said first end of the optical fiber an optical return signal emerging from the fiber after the converted modulated optical signal has passed therethrough, detecting the microwave signal from the converted modulated optical signal, and analyzing the microwave signal in order to determine the characteristics of the microwave signal.

2. A method according to claim 1, wherein in said step a) a base signal of constant power is generated.

3. A method according to claim 1, wherein in said step a) a modulated base signal is generated.

4. A method according to claim 1, wherein in said step b) effectively orthogonal optical polarization conversion is performed.

5. A means for retrieval of a microwave signal from a remote location and analyzing the microwave signal, including at a first end of an optical fiber,
   a first optical assembly which is arranged to input to said fiber a polarized optical base signal issuing from a generator and which is further arranged to recover from said fiber and to deliver to analysis means, a return optical signal, and at a second end of the fiber for being disposed at the remote location,
   a second optical assembly which is arranged in a loop comprising first means for receiving a polarized optical signal emerging from the fiber after the optical base signal has passed therethrough and for delivering said polarized optical signal to processing means which include, in series, second means for electro-optical modulation of said signal with the microwave signal which is to be transmitted to produce a modulated optical signal, and a third means for optical polarization conversion of said modulated optical signal to produce a converted modulated optical signal, and which is further arranged to pass the converted modulated optical signal to the first means which is adapted for inputting the converted modulated optical signal to said fiber as an optical return signal, and wherein the arrangement is such that the electro-optical analysis means detects the microwave signal and determines the characteristics of the microwave signal from the optical return signal emerging from the fiber after the processed optical signal has passed therethrough.

6. Means according to claim 5, wherein the first optical assembly includes first means forming an optical circulator placed between the first end of the optical fiber, the generator and the analysis means.

7. The means according to claim 6, wherein the first means forming the optical circulator includes two polarization separating prisms.

8. The means according to claim 5, wherein the first means of the optical assembly includes second means forming an optical circulator placed between the second end of the optical fiber and the input and output of the processing means.

9. The means according to claim 8, wherein the first means forming an optical circulator includes a set of two polarization separating prisms.

10. The means according to claim 8, wherein the polarization conversion means includes a half-wave strip.

11. The means according to claim 5, wherein the generator generates a constant power base signal, and the pass band of the analysis means is adjusted to the frequency spectrum of the microwave signal.

12. The means according to claim 5, wherein said generator also includes an oscillator which modulates the optical base signal, the pass band of the analysis means being adjusted to the frequency spectrum of the microwave signal recentered on the frequency of the oscillator.

13. A method for retrieval of a microwave signal from a remote location where an antenna receives the microwave signal, and for analyzing the microwave signal to evaluate operation of the antenna, including the steps of:
a) generating a polarized optical base signal and applying said signal as an input to a first end of an optical fiber;
b) recovering, at a second end of the optical fiber which is at the remote location, an optical signal emerging from the optical fiber after the base signal has passed therethrough, processing said emerging signal by passing the emerging signal along a loop, wherein along the loop the signal is first processed by electro-optical modulation with the microwave signal received by the antenna, which is to be transmitted, to produce a modulated optical signal, and second by polarization conversion of the modulated optical signal to produce a converted modulated optical signal, and third by reapplying the converted modulated optical signal as an input to the second end of the fiber; and
c) recovering at said first end of the optical fiber an optical return signal emerging from the fiber after the converted modulated optical signal has passed therethrough, detecting the microwave signal from the converted modulated optical signal, and analyzing the microwave signal in order to determine characteristics of the microwave signal for evaluating operation of the antenna.

14. A device for retrieval of a microwave signal from a remote location where an antenna receives the microwave signal, and for analyzing the microwave signal to evaluate operation of the antenna, including at a first end of an optical fiber, a first optical assembly which is arranged to input to said fiber a polarized optical base signal issuing from a generator and which is further arranged to recover from said fiber and to deliver to analysis means, a return optical signal, and at a second end of the fiber for being disposed at the remote location, a second optical assembly which is arranged in a loop comprising first means for receiving a polarized optical signal emerging from the fiber after the optical base signal has passed therethrough and for delivering said polarized optical signal to processing means which include, in series, second means for electro-optical modulation of said signal with the microwave signal received by the antenna and which is to be transmitted to produce a modulated optical signal, and a third means for optical polarization conversion of said modulated optical signal to produce a converted modulated optical signal, and which is further arranged to pass the converted modulated optical signal to the first means which is adapted for inputting the converted modulated optical signal to said fiber as an optical return signal, and wherein the arrangement is such that the electro-optical analysis means detects the microwave signal and determines the characteristics of the microwave signal from the optical return signal emerging from the fiber after the processed optical signal has passed therethrough for evaluating operation of the antenna.

* * * * *

UNITED STATES PATENT AND TRADEMARK OFFICE
CERTIFICATE OF CORRECTION

PATENT NO. : 5,307,195

DATED : April 26, 1994

INVENTOR(S) : Pierre Nicole

It is certified that error appears in the above-indentified patent and that said Letters Patent is hereby corrected as shown below:

On the title Page:

[56] References Cited, insert the following references:
-- FOREIGN PATENT DOCUMENTS
0287379    10/1988    European Patent Office
WO88/03730  5/1988    PCT International
2181912     4/1987    United Kingdom OTHER PUBLICATIONS
Japanese Abstract, SPACE OPTICAL COMMUNICATION DEVICE, Publication No. 60-194632, Publication Date 3/10/85, one page.
Zizzo, Optical circulator for fiber-optic transceivers; Applied Optics 26 (1987) 15 August, No. 16, New york, NY USA, pp. 3470-3473. --.

Abstract, line 3, after "first" change "and" to -- end --.

UNITED STATES PATENT AND TRADEMARK OFFICE
CERTIFICATE OF CORRECTION

PATENT NO. : 5,307,195
DATED : April 26, 1994
INVENTOR(S) : Pierre Nicole

It is certified that error appears in the above-indentified patent and that said Letters Patent is hereby corrected as shown below:

Column 4, line 30, before "reinputted" change "the" to -- then --.

Column 4, lines 44,45, delete the opening and closing parentheses.

Signed and Sealed this

Seventh Day of February, 1995

Attest:

BRUCE LEHMAN

Attesting Officer  Commissioner of Patents and Trademarks